Aug. 3, 1943.   J. W. THROCKMORTON   2,325,813
CONVERSION OF HYDROCARBON GASES
Filed Aug. 16, 1939
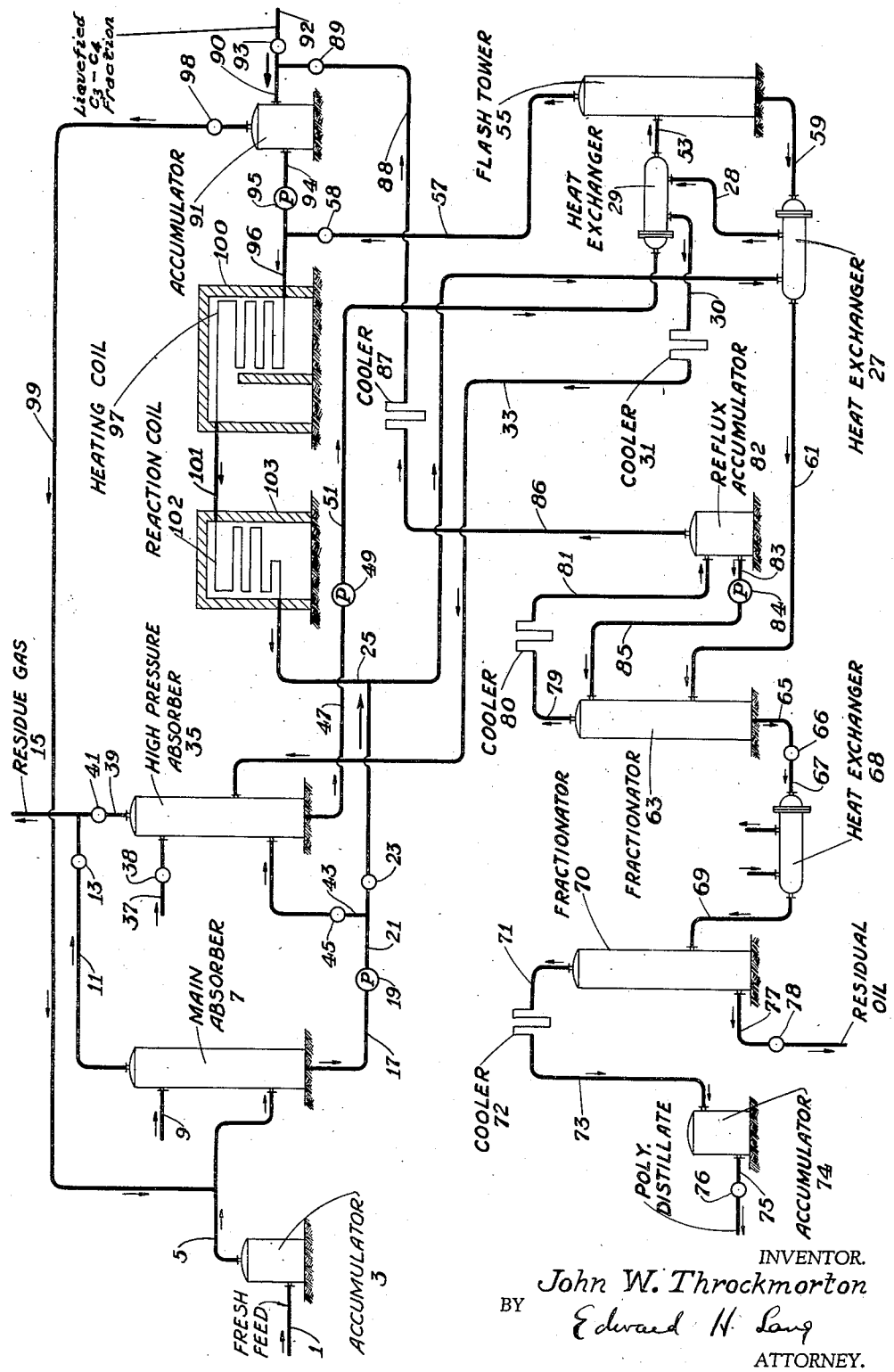
INVENTOR.
John W. Throckmorton
BY Edward H. Lang
ATTORNEY.

Patented Aug. 3, 1943

2,325,813

UNITED STATES PATENT OFFICE 2,325,813

CONVERSION OF HYDROCARBON GASES

John W. Throckmorton, Wilton, Conn., assignor to The Pure Oil Company, Chicago, Ill., a corporation of Ohio Application August 16, 1939, Serial No. 290,446

7 Claims. (Cl. 196—10)

The present invention relates to the conversion of normally gaseous hydrocarbons into hydrocarbons of higher molecular weight, particularly to hydrocarbons boiling within motor fuel boiling range.

It is an object of this invention to provide an improved process for polymerization of hydrocarbons wherein the amount of compression of gases is greatly reduced or even eliminated.

It is a further object to absorb and transfer low boiling hydrocarbons with a minimum ratio of absorption menstruum to low boiling hydrocarbons.

A still further object is to provide a very efficient means of heat conservation whereby the process is thermally highly efficient.

Other objects and advantages will be apparent from the following description taken in conjunction with the accompanying drawing, the single figure of which is a diagrammatic elevational view of apparatus suitable for carrying out the invention.

Referring to the drawing, the numeral 1 indicates a line by which gas is charged under suitable pressure to accumulator 3 from which the gas passes through line 5 to main absorber 7. This gas may be gas from refinery operations such as oil cracking, or natural gas, or a mixture thereof and consists principally of $C_2$, $C_3$ and $C_4$ hydrocarbons, and ordinarily contains a substantial proportion of olefinic hydrocarbons. The pressure under which the gas is charged may be from approximately 100 to 300 pounds per square inch and in any case it is slightly above the operating pressure of the main absorber 7. Suitable absorption menstruum from an oil fractionating or cracking unit or other suitable source, not shown, is supplied to the upper portion of the main absorber 7 through line 9. This absorption oil is preferably supplied at a temperature of approximately 70° to 100° F. The absorber oil and gas are intimately contacted in main absorber 7. Unabsorbed gases, comprising chiefly methane and hydrogen, are withdrawn from the upper portion of the main absorber through line 11, valve 13 and line 15 and removed from the system. The enriched absorber oil containing dissolved gases is withdrawn from the lower portion of the main absorber through line 17 and transferred by means of pump 19, line 21 and valve 23 to line 25 wherein the rich oil is intimately contacted with hot reaction products emerging from a heating and reaction zone maintained under conditions suitable for polymerization in a manner to be subsequently described.

The reaction products are quickly cooled to below reaction temperature by the rich oil. This temperature may be in the neighborhood of 700° F. or less. The mixture of rich oil and reaction products is cooled in heat exchanger 27, passes through line 28, is further cooled in heat exchanger 29 and passes through line 30 to cooler 31 wherein the temperature of the mixture is reduced to approximately 70–100° F. The cooled mixture then passes through line 33 to an intermediate portion of high pressure absorber 35 wherein gaseous reaction products are more completely absorbed in the rich absorber oil. The operating pressure of high pressure absorber 35 is preferably approximately 300 to 500 pounds per square inch. Fresh absorber oil if required, may be supplied to the upper portion of the high pressure absorber through line 37 and valve 38, the object being to maintain the proportion of absorber oil within such ratios that under the conditions of temperature and pressure prevailing in the absorber, substantially all $C_3$ and $C_4$ fractions plus a substantial portion of $C_2$ fraction, will be completely dissolved in the absorber oil. Unabsorbed gases comprising chiefly methane and hydrogen may be removed from the upper portion of the high pressure absorber through line 39, valve 41 and line 15 and removed from the system. In the event that only a portion of the rich absorber oil withdrawn from the main absorber 7 is required for the aforementioned quenching operation, the remaining portion of the rich absorber oil may be passed directly to the high pressure absorber by means of line 43 and valve 45. Rich oil is removed from the lower portion of high pressure absorber 35 through line 47, pump 49, line 51 and heat exchanger 29, wherein the temperature is raised to approximately 200°–350° F. by indirect heat exchange which the mixture of reaction products and rich absorber oil removed from the quenching operation, the heated products then passing through line 53 to an intermediate portion of flash tower 55 which may contain suitable fractionating apparatus if desired. The operating pressure of flash tower 55 is preferably 600–900 pounds per square inch. Under the conditions of temperature and pressure just described, an appreciable proportion of the lighter, normally gaseous hydrocarbons are fractionated from the rich oil and are separated as vapors. The vapors are removed from the upper portion of flash tower 55 through line 57. The major portion of the normally gaseous hydrocarbons remain dissolved in the absorber oil. The rich absorber oil is withdrawn from the lower portion of flash tower 55 through line 59 and passed in indirect heat exchange relation, in heat exchanger 27, with the mixture of hot products from the reaction zone and rich absorber oil from the main absorber which were commingled in the quenching operation. The rich oil removed from flash tower 55 through line 59 emerges from heat exchanger 27 at a materially increased temperature, the temperature preferably being approximately 350° F. to 550° F. and passes through line 61 to an intermediate point of fractionator 63 which contains suitable fractionating apparatus such, for example, as bubble plates. Fractionator 63 is operated under such conditions of temperature and pressure as to retain substantially all $C_5$ hydrocarbons in the liquid phase and to remove substantially all $C_3$ hydrocarbons overhead as vapors. The amount of $C_4$ hydrocarbons retained in the liquid fraction depends upon the vapor pressure desired in the liquid product, a high content of $C_4$'s producing a high vapor pressure liquid portion. Heavy polymers boiling above motor fuel boiling range, absorber oil and $C_3$ free motor fuel boiling range hydrocarbons are withdrawn as liquids from the lower portion of fractionator 63 through line 65, valve 66, line 67, pass through heat exchanger 68 wherein additional heat is supplied from an outside source and line 69 to low pressure fractionator 70. Hydrocarbons of motor fuel boiling range are vaporized and removed overhead through line 71, condensed in cooler 72, pass through line 73, collected in accumulator 74, withdrawn from the accumulator through line 75 and valve 76 and removed from the system. Heavy polymers boiling above the motor fuel boiling range and stripped absorber oil are withdrawn from the lower portion of fractionator 70 through line 77 and valve 78 and removed from the system.

Returning to fractionator 63, vaporized low boiling hydrocarbons, free of $C_5$ and heavier fractions, are withdrawn from the upper portion of fractionator 63 through line 79, cooled in cooler 80 and pass through line 81 to reflux accumulator 82. Liquid condensate is returned through line 83, pump 84 and line 85 to the upper portion of fractionator 63 to facilitate the fractionation therein. Uncondensed gases comprising $C_4$ and lighter hydrocarbons are removed from the upper portion of the reflux accumulator through line 86, further cooled in cooler 87, pass through line 88, valve 89 and line 90 to accumulator 91 and commingled therein with extraneous liquid, comprising chiefly $C_3$ and $C_4$ hydrocarbons which may be entirely paraffinic or a mixture of paraffinic and olefinic hydrocarbons supplied to the system through line 92 and valve 93 from a gas recovery plant or other suitable source not shown. The commingled materials in accumulator 91 are in a substantially liquid state and can be transferred by a pump instead of the usual and more expensive compressing operation. The commingled materials are withdrawn from accumulator 91 through line 94 and charged by pump 95, under suitable pressure which preferably is approximately 500–700 pounds per square inch, through line 96 to heating coil 97. Any uncondensed material in accumulator 91 passes through valve 98, line 99 and line 5 to main absorber 7.

Returning to flash tower 55, the gaseous products removed from the upper portion through line 57 pass through valve 58 to line 96 and are commingled therein with the aforementioned products discharged from charging pump 95, the pressure of the flash tower being maintained at a pressure sufficiently higher than the pressure in the charging line 96 to permit flow of gaseous products from the flash tower into the charging line without the necessity of a compression operation, and there, will to a large extent, liquefy when mixed with the heavier portion of the charge. The commingled products pass into heating coil 97 located within furnace 100 wherein the products are brought to the desired reaction temperature. The heated products at reaction temperature pass from heating coil 97 through line 101 to reaction coil 102 wherein the products are maintained under the desired conditions of temperature and pressure for a period of time sufficient to bring about conversion of a substantial portion of the materials charged, to normally liquid hydrocarbons.

Reaction conditions may vary from 100 in 2000 pounds per square inch pressure and 900° F. to 1300° F. temperature. Conditions which have been found particularly effective are pressures of 500–700 pounds per square inch and temperatures of 1050°–1200° F. Reaction time may range from 10 to 100 seconds. The reaction coil is preferably of larger cross-sectional area than the heating coil and may in some cases take the form of a chamber. The reaction coil is preferably enclosed in a suitable housing 103 which will permit controlled passage therethrough of a heating or cooling medium such as combustion gases or air in order to control the temperature in the reaction coil. It is necessary to provide for both heating and cooling of the reaction coil since the net heat of reaction of the hydrocarbons may be either endothermic or exothermic, depending upon the unsaturate content of the gases entering the reaction zone. It is obvious that heating coil 97 and reaction coil 102 may both be located within a single furnace structure so long as the necessary conditions of temperature, pressure and reaction time can be controlled as described. As previously described, the reaction products upon leaving the reaction coil through line 25 are immediately and quickly chilled to below reaction temperature by means of direct contact with rich oil withdrawn from main absorber 7.

As an example of the low oil circulation rates which may be used in the process, the following data of representative conditions of operation are submitted: Fresh gas comprising approximately 20% $C_2$, 47% $C_3$ and 30% $C_4$ hydrocarbon fractions is charged to the main absorber at a rate of 18,700 pounds per hour and extraneous liquid charged at a rate of 2,160 pounds per hour. With these rates of fresh feed and a reaction temperature of 1125° F., 55 gallons per minute of hydrocarbon gas oil fraction are supplied for the absorption operation in the main absorber and 18 gallons per minute additional gas oil for the absorption operation in the high pressure absorber. The gas oil is preferably used on a once through basis although it is apparent that all or a portion of the bottoms from fractionator 70 may be recycled to the system.

It will thus be seen that I have achieved the objects of my invention since the aforementioned and described process provides for an efficient polymerizing process wherein the need for compression of gases has been eliminated and low oil circulation rates provided, with attendant economies of operation. While I have described my invention with respect to a specific example and have illustrated a preferred form of apparatus for carrying out the various operations incident to my process, it will be understood by those skilled in the art that my invention is not limited to such operative or mechanical details herein described except as defined by the following claims.

I claim:

1. Process for converting normally gaseous hydrocarbons to hydrocarbons boiling within a range suitable as liquid motor fuel comprising subjecting said gases to suitable conditions of temperature and superatmospheric pressure for a sufficient period of time to convert a substantial portion of said gaseous hydrocarbons into liquid hydrocarbons, cooling the reaction products to below reaction temperature, further cooling the reaction products by heat interchange with partially stripped absorption menstruum followed by heat interchange with said absorption menstruum prior to the partial stripping thereof, contacting said cooled reaction products in an absorber with liquid absorption menstruum under superatmospheric pressure under such conditions that substantially only those fractions not suitable for recycling are unabsorbed, separating unabsorbed fractions from the system, removing rich menstruum from said absorber and heating the same by said second mentioned heat interchange step, separating at least a portion of the normally gaseous hydrocarbons, heating the partially stripped rich menstruum by said first mentioned heat interchange step, and separating material of motor fuel boiling range.

2. Process in accordance with claim 1 where the reaction products are cooled by direct contact with rich menstruum containing fresh gases charged to the system.

3. Process in accordance with claim 1 where the portion of the normally gaseous hydrocarbons separated from rich menstruum is returned to the conversion zone.

4. In a process for converting hydrocarbon gases to liquid hydrocarbons, the steps comprising contacting hydrocarbon gases with absorption oil under conditions whereby to absorb a portion of said gases in said oil, stripping a portion of the absorbed gases from the rich oil in a first step and stripping additional absorbed gases from the partially stripped rich oil in at least one additional step, charging stripped gases to a conversion zone wherein they are subjected to suitable conditions for converting gases into liquids, cooling reaction products leaving said conversion zone by indirect heat interchange with said rich absorption oil and by indirect heat interchange with said partially stripped rich oil, charging the cooled reaction products to said absorption step and separating gasoline boiling hydrocarbons from the stripped oil obtained from the final stripping step.

5. The steps in accordance with claim 4 in which the reaction products are brought into indirect heat exchange with partially stripped absorption oil prior to being brought into indirect heat interchange with unstripped rich absorption oil.

6. The steps in accordance with claim 4 in which the reaction products leaving the conversion zone are cooled by direct contact with at least a portion of the unstripped oil containing dissolved gases prior to the indirect heat exchange steps.

7. Process for converting normally gaseous hydrocarbons to hydrocarbons boiling within a range suitable as liquid motor fuel comprising charging fresh liquefied gas to a conversion zone, subjecting said gas to suitable conditions of temperature and superatmospheric pressure for a sufficient period of time to convert a substantial portion of said gaseous hydrocarbons into liquid hydrocarbons, quickly cooling the reaction products to below reaction temperature by direct contact with a portion of rich menstruum having dissolved therein fresh gases charged to the system, cooling the mixture of reaction products and rich menstruum and contacting said mixture in a separate absorption zone with liquid absorption menstruum under such conditions of temperature, pressure and absorption menstruum to mixture ratio as to absorb substantially all the $C_3$ and $C_4$ hydrocarbons and a portion of the $C_2$ hydrocarbons and separating therefrom unabsorbed gases comprising chiefly methane and hydrogen, removing said unabsorbed gases from the system, passing the rich menstruum mixture into a flashing zone maintained under higher pressure than the pressure in said conversion zone and therein separating at least a portion of the normally gaseous hydrocarbons dissolved in said menstruum mixture and recycling said gaseous hydrocarbons to the conversion zone, separating from the partially stripped rich menstruum mixture additional normally gaseous hydrocarbons and motor fuel boiling range hydrocarbons at a pressure below that existing in said conversion zone but sufficiently high to liquefy the gaseous hydrocarbons upon cooling and returning said additional liquefied normally gaseous hydrocarbons to the conversion zone.

JOHN W. THROCKMORTON.